Feb. 5, 1952  C. F. SCHAEFER  2,584,230
RECIPROCAL INTEGRATOR GEARING
Filed Jan. 18, 1950
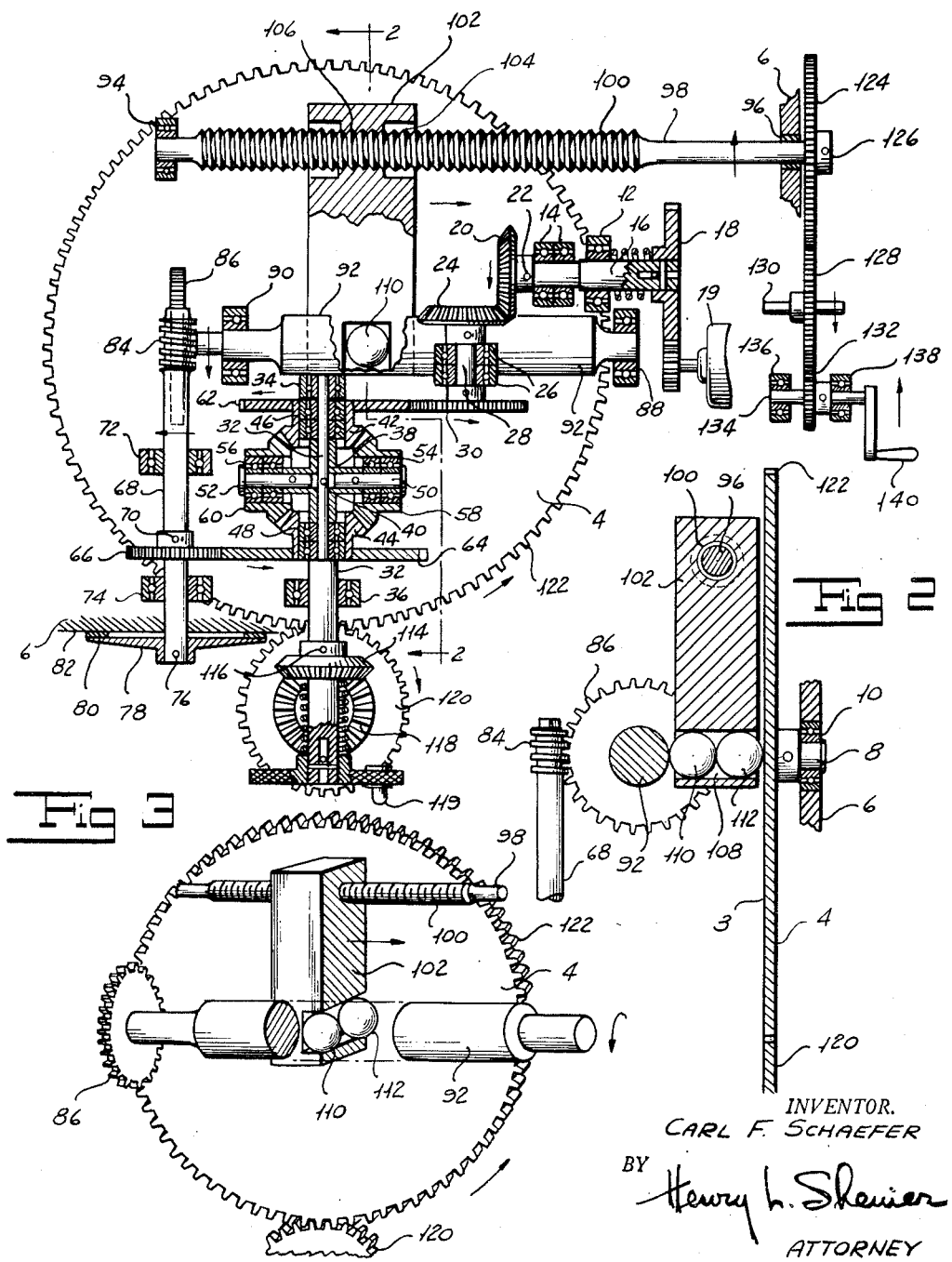
INVENTOR.
CARL F. SCHAEFER
BY Henry L. Shenier
ATTORNEY Patented Feb. 5, 1952

2,584,230

UNITED STATES PATENT OFFICE 2,584,230

RECIPROCAL INTEGRATOR GEARING

Carl F. Schaefer, Port Washington, N. Y., assignor to The Norden Laboratories Corporation, New York, N. Y., a corporation of Connecticut Application January 18, 1950, Serial No. 139,293

9 Claims. (Cl. 74—394)

My invention relates to a reciprocal integrator and more particularly to a device for producing the function $$Z = \int \frac{dx}{y}$$

where, for example, Z equals azimuth, $x$ equals time, and $y$ equals range. Reciprocal integrators are useful in many applications where it is desired to generate the function pointed out above, as, for example, computors and the like.

One object of my invention is to provide a reciprocal integrator capable of generating a function equal to $$\int \frac{dx}{y}$$

Another object of my invention is to provide an azimuth integrator adapted to compute the function $$\frac{dt}{R}$$

where $t$ is a function of time and R is a function of range.

Another object of my invention is to provide a computor for producing a reciprocal integral of a simple and sturdy construction.

Another object of my invention is to provide an improved mechanism for computing the function $$\frac{dx}{y}$$

Other and further objects of my invention will appear from the following description.

In general, my invention contemplates the provision of a prime mover driven at a constant speed to generate an input torque as a function of time. The input torque is applied to one side gear of a differential. The differential is connected to drive a disk. The rotation of the disk is transmitted to a roller through an adjustable friction drive, the speed of rotation of the roller and its direction of rotation being governed by the position of the friction drive with respect to the driving disk. The other side gear of the differential drives a shaft having a driving worm meshing with a gear which is secured to the roller shaft for rotation therewith. The shaft which carries the worm is mounted for movement axially of its bearings and carries a brake disk adapted to increase the friction upon the worm shaft whenever it is attempted to transmit torque from the worm to the roller. The arrangement is such that torque is transmitted from the differential to the disk but not from the disk to the differential. The initial driving torque applied to the differential will drive the disk, which in turn will drive the roller. Part of the torque is split rotating the worm shaft. The torque is largely absorbed by the brake. If the disk drive of the roller rotates the roller at a speed which is greater than that at which the worm tends to drive it, the worm shaft will move axially of its bearings due to the worm drive in a direction lessening the friction between the brake disk and its bearing surface lessening the load on the worm shaft. This reduces the friction load on the worm shaft and permits it to rotate at a higher speed, and due to the action of the differential drive, the disk at a correspondingly lower speed. The arrangement is such that there is an automatic balancing of the torque between the worm drive and the disk drive. Similarly, if the worm tends to drive the roller at a speed higher than it is being driven by the disk, the reaction between the worm and its interengaging gear will move the worm shaft axially of its bearings, tending to increase the brake friction. This will slow the rotation of the worm shaft and cause the differential to increase the speed of the disk, again balancing the torque.

The construction and arrangement of the parts are such that for every position of the friction drive the disk will be driven at a predetermined speed, that is, by the application of a predetermined torque. The torque applied to the disk drive will represent the output or the desired reciprocal integral.

In the accompanying drawings which form part of the instant specification and which are to be read in conjunction therewith, and in which like reference numerals are used to indicate like parts in the various views:

Figure 1 is an elevation of a reciprocal integrator containing one embodiment of my invention with parts in section.

Figure 2 is a sectional view taken along the line 2—2 of Figure 1.

Figure 3 is a fragmentary perspective view drawn on a smaller scale of the parts shown in Figure 2.

Referring now to the drawings, a disk 4 is rotatably mounted for rotation about a shaft 8 carried in a bearing 10 mounted on a suitable frame 6 of any desired construction. The frame carries bearings 12 and 14 in which a shaft 16 is rotatably mounted. Secured to one end of the shaft 15 for rotation therewith I provide a gear 18 which is adapted to mesh with a prime mover 19 so that the gear 18 will be driven at a constant speed. To the shaft 16 is secured by pin 22 a bevel gear 20 so that the bevel gear will rotate with the shaft 16. The bevel gear 20 meshes with a bevel gear 24 mounted in the bearings 26 carried by the frame. The bevel gear 24 is secured to a shaft 28 to which is also secured a gear 30 so that the gear 30 will be driven from gear 18 at a constant speed. A shaft 32 is mounted for rotation in bearings 34 and 36. A sleeve 38 of a differential is secured to the shaft 32 by a pin 40. The differential comprises bevel gear 42 and bevel gear 44 representing the side gears of the differential. These gears are mounted for rotation about bearings 46 and 48 loosely carried by the shaft 32. The sleeve 38 carries a pair of stub shafts 50 and 52 carrying bearings 54 and 56. A bevel gear 58 is carried by the bearing 54 and engages both side gears 42 and 44. A bevel gear 60 is carried by the bearing 56 and engages both side gears 42 and 44. The gear 42 carries a gear 62 which is secured to it for rotation therewith as a unit. The side gear 44 of the differential carries a gear 64 secured thereto for rotation therewith as a unit. The arrangement is such that if gear 64 is immobilized the gear 30 will drive the gear 62 and hence the gear 42. This will rotate planetary gears 58 and 60 rotating the sleeve 38 and hence the shaft 32. If the shaft 32 were immobilized the input would drive the gear 64. In other words, through the use of the differential all of the input may be directed to the gear 64, all of the input may be directed to the shaft 32, or the input may be divided between shaft 32 and the gear 64 depending upon the resistance to rotation of the gear 64 with respect to the shaft 32. The gear 64 meshes with a gear 66 which is secured to a shaft 68 by means of a pin 70. The shaft 68 is mounted in a pair of bearings 72 and 74 carried by the frame 6 for both rotational and axial movement. Secured to the end of shaft 68 by means of pin 76 I provide a brake disk 78 which carries a brake lining 80 of cork or the like adapted to bear against a stationary brake surface 82 formed upon the frame 6. The other end of the shaft 68 carries a worm 84 which meshes with a worm gear 86 of a comparatively low pitch so that rotation of the worm may drive the gear 86 but the gear 86 can not drive the worm 84. In a pair of bearings 88 and 90 carried by the frame, I mount a roller 92. To one end of the roller for rotation therewith I secure the gear 86. Above the roller 92 and parallel thereto in bearings 94 and 96 I mount a shaft 98 provided with screw threads 100. A carriage 102 is provided with a bore 104 internally threaded at 106 with screw threads coacting with the threads formed upon the screw 100. The carriage is provided with a bore 108 in which I position a pair of balls 110 and 112 extending between the surface 3 of the disk 4 and the peripheral surface of the roller 92. The arrangement is such that the balls comprise a friction drive between the disk and the roller. The rotation of ball 112 will rotate the roller 92. A bevel gear 114 is secured by pin 116 to the shaft 32 for rotation therewith. The bevel gear 114 meshes with a bevel gear 118 formed integrally with the gear 120. The gear 120 meshes with the gear teeth 122 formed about the periphery of the disk 4. The arrangement is such that the rotation of the shaft 32 will drive the disk at a speed which is a function of the rotation of the shaft 32. A gear 124 is secured to the screw shaft 98 by means of pin 126. The gear 124 meshes with an idle gear 128 rotatably mounted on shaft 130. The idle gear 130 meshes with the gear 132 mounted on a shaft 134 which is rotatably mounted in bearings 136 and 138. A setting crank 140 is secured to the shaft 134 so that upon rotation of the crank the screw 100 will be rotated to move the carriage 102 longitudinally of the axis of rotation of the shaft 98.

In operation the gear 18 is driven at a constant speed rotating the bevel gear 20, its meshing gear 24 and driving the gear 30. Let us assume that the direction of rotation of this drive is such that the gear 30 will rotate in a counterclockwise direction viewed from above. The gear 30 will drive the gear 62 and hence the side gear 42 of the differential in a clockwise direction viewed from above and thus driving the shaft 32 in a clockwise direction. The shaft 32 will rotate the bevel gear 114 in a clockwise direction viewed from above and will thus drive the gear 120 in a clockwise direction viewed from the front. This will drive the disk 4 in a counterclockwise direction viewed from the front. Let us assume that the friction ball carriage 102 is displaced to the right of the center of the disk. This will rotate the roller 92 in a counterclockwise direction viewed from the right. The part of the input torque to the differential drives the side gear 44 and the gear 64 in a counterclockwise direction viewed from above thus rotating the gear 66 and the shaft 72 in a counterclockwise direction viewed from below. This rotation will tend to drive the gear 86 and the roller 92 in a counterclockwise direction viewed from the right.

Let us now assume that the balance of the torque between the worm drive and the disk is such that the disk tends to drive the roller too fast. This will tend to rotate the gear 86 in a counterclockwise direction viewed from the right more rapidly than that indicated by the rotation of the worm 84. The worm 84 and its associated shaft therefore will be moved downwardly as viewed in Figure 1, lessening the brake pressure of the brake disk 78 upon the stationary brake surface 82. The reduction of the frictional load upon shaft 68 will permit the differential to increase the speed of rotation of the gear 64 and correspondingly reduce the speed of rotation of the shaft 32, that is, the action will tend to balance the speed of rotation of the worm with the speed of rotation of the roller. Let us now assume that the disk speed is slower due to the fact that too much of the differential output is being applied to the shaft 68 through the gear 64. When this occurs the worm 84 will rotate faster than it should to drive the gear 86 at a speed at which gear 86 is rotated. When this occurs the worm will advance the shaft 68 upwardly pulling the brake disk 74 more strongly against the stationary brake surface 82, thus tending to set the brake. This increases the load upon the gear 64 and the side gear 44, thus causing the shaft 32 of the differential to turn at a higher speed and accordingly drive the disk at a higher speed again tending to balance the speed of the roller to the speed of the worm. It will be seen that for every setting of the balls due to the adjustment of carriage, the differential shaft 32 will be constrained to rotate at a given speed.

In operation, time is represented by the input of the constant speed motor to gear 18. Range is set into my reciprocal integrator by means of the handle 140 setting the carriage 102. In a typical case the motor may drive the gear 18 at a speed of 1800 R. P. M. The design constants may be such that each revolution of the crank 140 may represent any increment of range of a thousand feet. The desired function representing the integral of $$\frac{dt}{R}$$

may be taken off by means of the pin 119 which rotates with the shaft 32. It will be clear to those skilled in the art that the greater the range setting the higher will be the rotation of the roller 92, and hence the smaller will be the rotation of the shaft 32. The arrows in Figure 1 represent the direction of movement for increasing inputs.

It will be seen that I have accomplished the objects of my invention. I have provided a reciprocal integrator capable of generating a function equal to $$\int \frac{dx}{y}$$

I have provided an azimuth integrator adapted to compute the function $$\frac{dt}{R}$$

where $t$ is a function of time and R is a function of range. I have provided a reciprocal integrator of simple and sturdy construction which is accurate in operation and capable of running constantly over long periods of time, and in which the range may be readily varied.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A reciprocal integrator including in combination a differential having an input means and a pair of output means, means for driving the input means at a constant speed, a first means driven by one of said output means, a second means driven by the other of said output means and by said first driven means, means for increasing the torque applied to said first output means when said second driven means is driven at a higher speed by said second output means than by said first driven means and for decreasing the torque applied to said first output means when said second driven means is driven at a higher speed by said first driven means than by said second output means, and means driven by said first output means representing the desired reciprocal integral.

2. A reciprocal integrator including in combination a differential having an input means and a pair of output means, means for driving the input means at a constant speed, a disk driven by one of said output means, a roller, means driven by the other of said output means for driving the roller, means driven by the disk for driving the roller, means for increasing the torque applied to the first output means when the roller is driven at a higher speed by the second output means than by the disk and for decreasing the torque applied to the first output means when the roller is driven at a higher speed by the disk than by the second output means, the rotation of said first output means representing the desired reciprocal integral.

3. A reciprocal integrator as in claim 2 in which said means for driving the roller from the disk comprises a friction drive and means for adjusting the mechanical advantage of said drive between the disk and the roller.

4. A reciprocal integrator as in claim 2 in which said means for driving the roller from said second output means comprises a worm meshing with the worm gear carried by the roller.

5. A reciprocal integrator as in claim 2 in which said means for driving the roller from said second output means comprises a worm meshing with the worm gear carried by the roller, means for mounting said worm for both rotational and axial movement, a brake plate carried by the worm adapted to be set and released by the axial movement of said worm, the construction being such that when the disk drives the roller faster than it is being driven by said second output means the brake pressure is lessened and when the second output means drives the roller faster than it is driven by the disk the brake pressure is increased.

6. A reciprocal integrator including in combination a differential having an input means and a pair of output means, means for driving the input means at a constant speed representing one term of the desired function, a disk driven by one of said output means, a roller having a worm gear, a worm shaft having a worm meshing with said worm gear, means for driving said worm shaft from said second output means for rotating said roller, a friction ball drive positioned between said disk and said roller whereby rotation of said disk will apply torque to said roller, means for radially adjusting the point of contact of said friction drive along the surface of said disk, the radius of displacement of said friction drive from the center of said disk representing another term of the desired function, and means for balancing the torque applied to drive the roller from said second output means with the torque applied to drive the disk from said first output means.

7. A reciprocal integrator as in claim 6 in which said worm shaft is mounted for axial movement, a brake disk caried by said worm shaft, the construction being such that when said roller is driven by said second output means at a speed greater than said roller is driven by said disk said worm will move the worm shaft axially to increase the brake pressure, thereby simultaneously reducing the worm drive from said second output means and increasing the torque applied to the disk drive from said first output means.

8. A reciprocal integrator including in combination a shaft, a differential having a pair of side gears and a third gear meshing with said side gears mounted about said shaft, means for mounting said third gear for rotation, means for securing said mounting means to said shaft, a prime mover for rotating one of said side gears, a disk, means for rotating said disk from said shaft, a roller mounted adjacent said disk and having its axis parallel to the surface of said disk, said roller being formed with a worm gear secured thereto for rotation therewith, a shaft having a worm meshing with said worm gear, said shaft being mounted for rotation and for axial movement, means for driving said shaft from the other side gear of said differential, a carriage having a portion extending between said roller and said disk, a pair of friction balls mounted in said carriage engaging each other and the roller and the disk, means for moving said carriage longitudinally of said roller to vary the mechanical advantage between the disk and the roller, the construction being such that torque is transmitted from the differential to the disk but not from the disk to the differential due to the worm gear and worm drive of the roller.

9. A reciprocal integrator as in claim 8 in which said worm shaft is provided with a brake disk adapted to coact with a stationary part, the construction being such that when the torque transmitted to the disk is less than the torque transmitted to the roller the worm shaft will move axially to increase the brake pressure and when the torque transmitted to the disk is greater than the torque transmitted to the roller the worm shaft will move axially to lessen the brake pressure whereby to balance the torque transmitted by the differential to the roller and to the disk agreeable to the setting of the friction balls from the center of rotation of the disk.

CARL F. SCHAEFER.

No references cited.